Dec. 27, 1955  M. A. RUDNER  2,728,698
CEMENTABLE POLYTETRAFLUOROETHYLENE AND THE METHOD
OF MAKING ARTICLES THEREOF CEMENTABLE
Filed Dec. 10, 1953
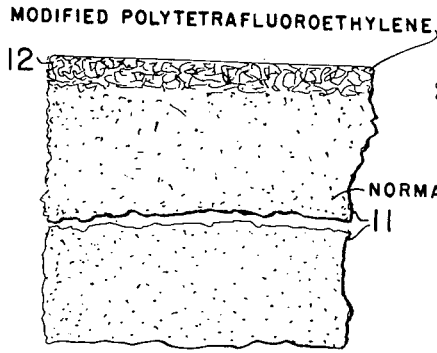
FIG.1
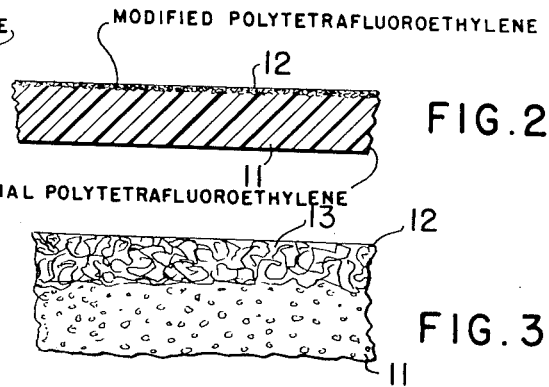
FIG.2
FIG.3
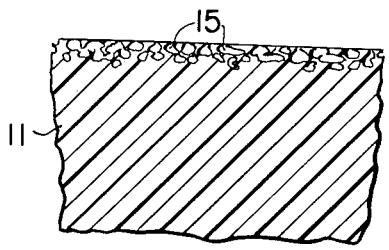
FIG.4
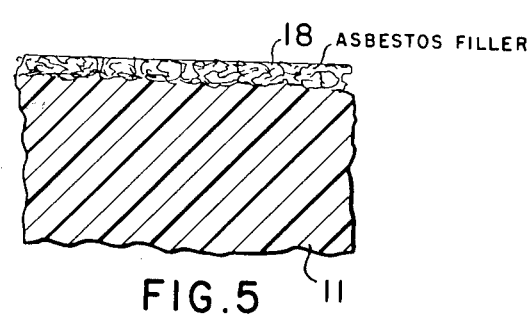
FIG.5
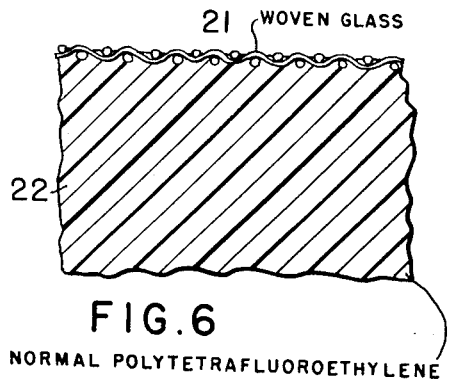
FIG.6
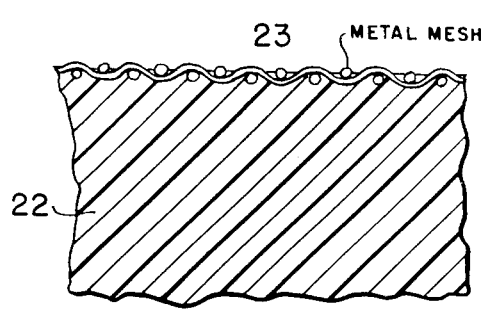
FIG.7
*INVENTOR.*
Merritt A. Rudner
BY
ATTORNEY

United States Patent Office

2,728,698
Patented Dec. 27, 1955

2,728,698

CEMENTABLE POLYTETRAFLUOROETHYLENE AND THE METHOD OF MAKING ARTICLES THEREOF CEMENTABLE

Merritt Allen Rudner, Haddonfield, N. J., assignor to United States Gasket Company, Camden, N. J., a corporation of New Jersey Application December 10, 1953, Serial No. 397,422

16 Claims. (Cl. 154—43)

This invention relates to polytetrafluoroethylene, and particularly to a method of making such material cementable. The invention relates further to articles made from this material, which are caused to have selected surface areas on the article characterized by a susceptibility to cements of various kinds, whereby a strong cohesive bond may be established between the polytetrafluoroethylene and the surfaces of other materials such as wood, glass, metal or the like.

In a general sense, the method aspect of the invention may be considered to be a method of imparting controlled porosity to the selected area of the surface of an article, to make that surface receptive to some pre-selected cementable bonding material. The other aspect of the invention is the production of an article, either as raw stock, or as a finished article, on which an area of the surface is selectively controlled or modified during the formation of the body, to cause that surface to have the characteristic of controlled porosity that will make that porous surface receptive to a cement for bonding an external element to that controlled porous surface.

Polytetrafluoroethylene is presently made and sold under the trademark Teflon, which is the trademark of the product made by the Du Pont Company. One of the striking physical characteristics of Teflon is its ability to resist wetting and sticking. It is therefore impervious to water and moisture. The material is chemically extremely stable. It therefore resists both acids and alkalies alike, under normal ambient temperature conditions, and in fact up to about 500 degrees Fahrenheit.

Its non-sticking characteristic makes the Teflon material excellent for many physical applications, for example, where food products are processed, since the food products will not stick to a plate or sheet of this Teflon material, and, in turn, are not affected by this material.

Since the Teflon material is resistant to acids and alkalies, it is an ideal insulation against external materials and conditions that are normally corrosive to other materials or metals.

The resistivity of Teflon is very high. Its power factor loss is low and its specific dielectric capacity is very close to that of air. These characteristics combine to make Teflon an excellent base material for electronic applications. However, because of the non-sticking surface characteristic of Teflon, it has been considered impossible, and in fact, it has been impossible, to provide a direct physical bonding or cementing between a Teflon body and any external material or member, either to support the Teflon, or to use the Teflon as a support for the external material or member.

Some progress has been made recently in modifying the nature of a Teflon body in a shallow region beneath a predetermined surface area, by changing the characteristic of the Teflon body at that surface area sufficiently to cause that surface area to be receptive to a metallic bond such as solder, or to cement bonds under certain conditions.

The modification of a shallow surface region of the Teflon body adjacent a predetermined surface at which a metallic bond is desired, is disclosed and claimed in a copending application, Serial No. 221,197, filed April 16, 1951, by Merritt A. Rudner and assigned to the assignee of this application. In that application is disclosed the process for treating the Teflon by adding and homogeneously distributing a metal powder in a transition region directly beneath the predetermined area of the surface at which a metallic bond is desired. The metallic powder is well mixed with the Teflon powder of the transition region as a step during the formation of the Teflon body and prior to the usual sintering operation to which the Teflon is subjected to harden and fix the Teflon body to form the final article. Thus, the metallic content adjacent the surface to be bonded establishes a substantially metallized area on the Teflon article that is consequently compatible with other usual metals that may be bonded to a metal base by the conventional processes of cold metal working, metal spraying, electro-deposition or soldering, or cementing.

In another application of Merritt A. Rudner, Serial No. 273,508, filed February 26, 1952, is disclosed a different process whereby the transition region of the Teflon body directly beneath the surface to which a cemented bond is to be formed consists of a homogeneous mixture of Teflon and a cementing material which is the same as, or compatible with, the material which is to be used to establish the cementing bond to the Teflon article. In that process the compatibility between the cement to be used as a bond, and the same cement, or a compatible cement, which is mixed in the transition zone of the Teflon material, enables a cohesive bond to be formed at the surface of the Teflon article by the cementing and bonding of the externally applied cement to the surface of the Teflon article. The applied cement and the compatible cement in the Teflon body form a strong tight cohesive bond.

While both of the foregoing processes are admirably suited to many applications where the desirable characteristics of Teflon are wanted, there are still many applications in which a Teflon article free of metal content is desired, or a Teflon article free of other materials that cannot tolerate the high operating temperatures or other environmental conditions to which Teflon may be subjected without damage, or a Teflon article free of any other materials.

Thus, the primary object of this invention is to provide a new Teflon article and a new process for treating a Teflon body so that in its final form it shall consist only of Teflon material and yet be characteristically cementable with any kind of bonding or cementing material, that would normally not adhere to the surface of a conventional Teflon body or article formed in the conventional method.

Another object of this invention is to provide a method of treating and preparing Teflon to modify its original characteristics sufficiently to enable the modified and treated Teflon to form a body or article with a controlled porous surface, even though otherwise formed, pressed and sintered by the usual conventional method and procedure. The porous surface thus formed is receptive to a bonding or cementing medium that is applied to that surface, and thereby permits the cementing or bonding of a Teflon article to any other article on which the cement would normally have a bonding action, such as glass, wood, metal, ceramic or the like.

This invention is based upon and utilizes a change that takes place in one of the physical characteristics of polytetrafluoroethylene when it is subjected to a high temperature and then permitted to cool. In the present conventional method for forming a finished article from polytetrafluoroethylene, the original powder is disposed in a suitable forming mold in a loosely packed form that is about four or five times the volume of the final desired article, and that loose powder is then compressed to the form of the final desired article, at a four or five to one volume ratio.

The compressed body of powder is readily frangible, but, if carefully handled, will hold together for suitable disposition in a tray or other support to place the compressed body in a furnace. In the furnace the compressed body is then subjected to an elevated temperature which, in present conventional practice, is about 600 to 700 degrees Fahrenheit. In certain modifications of the conventional process, the body is maintained under compression during the entire sintering operation and during a portion of the subsequent cooling process. The cooling process may be gradual, for annealing purposes, or it may be a sudden cooling by chilling the sintered body in a fluid bath such as oil or water.

In another modification of the conventional process, the body may be heated to its sintering temperature without being subjected to an external pressure. In certain such cases the body may be re-tempered by being slightly elevated in temperature, not quite as high as its sintering temperature, and then subjected to pressure in order to vary the external dimensions slightly.

In its original condition, the polytetrafluoroethylene powder particle is somewhat fibrous at its surface. This fibrous structure permits relatively tight packing and interlocking between adjoining particles. The sintering and subsequent cooling operation converts the Teflon powder material into a tough plastic material. Each particle is modified by the high sintering temperature and subsequent cooling, and is caused to have a relatively hardened shell. This effect in the change of the physical characteristics of the Teflon material may be considered to be a case-hardening or case-toughening of the particles.

This case-hardening or toughening that is imparted to the particles of the polytetrafluoroethylene by the sintering and cooling operation, changes the surfaces of the particles so that they all exhibit non-fibrous surface characteristics. A quantity of particles of such construction and characteristics may be reformed into a body of desired shape and resintered and cooled, but the bond between particles is much weaker, and the strength of the article formed is correspondingly diminished.

In accordance with the principles of this invention, the case-hardened shells of the sintered particles are broken by fracturing the particles into parts of smaller size. As a result, the inside surfaces at the fractures are exposed. Those inside surfaces exhibit the same fibrous characteristics as the surfaces of the original particles before being sintered. In order to establish such fracturing action, the sintered material is finely ground and micro-pulverized. The resultant particles may be pictured as particles whose surfaces are partly still case-hardened and partly fibrous. Those fractured particles are then used to form the surfacing layer on a product of polytetrafluoroethylene where the cementable characteristic is to be located.

In another aspect of the invention, small particles of the previously sintered material may be derived by other mechanical operations to provide particles with surfaces exposing the original fibrous surface structure. Thus, for example, in addition to any conventional pulverizing processes, previously sintered bodies may be subjected to grinding wheels, sanding belts or mechanical elements effecting a filing action against the body, to remove small particles which expose small fibrous areas and also have irregular shapes.

For clearness and convenience of designation, this case-hardened material and its derivatives will be referred to as post-sintered, and the original or virgin powder material, not yet heated, will be referred to as pre-sintered.

These post-sintered particles that are thus obtained by mechanical attrition from sintered bodies of polytetrafluoroethylene material, thus provide a different and modified form of the material, which is otherwise compatible with the same material in its original or pre-sintered state. Thus two quantities of the two materials, that is, the pre-sintered original virgin material and the post-sintered modified material, may be readily combined and re-molded and again re-sintered to form an integral Teflon body of desired shape and size. However, particles of the modified form tend to form bonds to adjoining modified particles in such manner as to leave small spaces or cells, defined by the smooth shell or case-hardened surface areas, disposed adjacent areas of firm cohesive bonding between engaging fibrous areas re-exposed by the pulverizing or equivalent fracturing action on the pre-sintered material.

The layer of modified polytetrafluoroethylene when compressed to its final dimension thus constitutes a relatively porous or cellular structure, but is otherwise characterized by the same physical and chemical characteristics of unmodified material.

The particular advantage of such modified form of polytetrafluoroethylene is that in its compression to one-fourth or one-fifth of its initial volume or depth, according to present conventional procedure, the slightly porous layer or matrix is formed as distinguished from the substantially compact non-porous structure formed by compression of the pre-sintered powder alone. The porosity of the matrix layer may be controlled by varying the proportion of the post-sintered material mixed with pre-sintered material to form the porous layer. That layer is then quite ready to receive a fluid cement, and to permit such fluid cement to flow into the porous cavities or cells and there to solidify and take root and anchor to provide a tight bonding action to the polytetrafluoroethylene body. The cement thus bonds to the body, and, in turn, bonds to the other surface to which the body is to be joined by the cement.

In preparing a Teflon body according to the present invention, a suitable basic quantity of normal pre-sintered polytetrafluoroethylene is provided in the mold, in accordance with standard conventional procedure, to constitute the basic body portion, and then a layer of the modified post-sintered fibrous material is disposed at a selected area of the basic quantity to provide the final layer surface at which the cementing action will be desired on the final article. The entire body of pre-sintered material overlayed by the post-sintered fibrous material is then compressed and shaped to the size and form of the ultimate article that is to be made, and the compressed body thus formed is then subjected to the usual sintering operation at the elevated temperature normally employed for an article of such shape and size, and is heated for the corresponding appropriate period of time to assure the complete sintering of the article.

The sintering and cooling operations for preparing articles of this invention may follow the conventional practice. Thus this invention provides the advantage of utilizing, completely, present conventional procedures, practices and equipment, and includes merely the simple step of pre-sintering a supply of Teflon material and then modifying the sintered material to provide the comminuted particles necessary to form the porous surface layer material.

That action on the sintered material modifies the physical structure of the sintered particles to partially restore the initial natural fibrous condition and to retain in part the non-fibrous characteristic established by the sintering operation.

As previously stated, the modified material may be derived from the post-sintered material by various mechanical operations, such as grinding, sanding, filing, or the like. In the micro-pulverization action, the post-sintered material may be first frozen, as in liquid nitrogen, before the grinding operation.

The provision of the modified material as a surfacing layer is one form of the invention, with the feature of controlled porosity in a shallow surface region to be susceptible to cementing action. Other embodiments of the invention will be described below, that provide a cementable surface of controlled porosity.

A manner in which the primary form of the invention is practiced is shown in somewhat more detail, in the accompanying drawings, in which:

Figure 1 is a schematic view of a quantity of polytetrafluoroethylene powder in its original state, with a superposed layer of post-sintered and comminuted polytetrafluoroethylene in fibrous form, before the two quantities of combined material are to be subsequently sintered;

Figure 2 is a similar view showing the relative height of the material of Fig. 1, as an integral body, after compression; and Figure 3 represents an enlarged section at a surface of the compressed body of Fig. 2, and serves to indicate the relatively compact close nature of the main body of the article, and the relatively porous or matrix form of the superposed layer of modified post-sintered material;

Figure 4 is a schematic sectional view of a body portion in which a surface layer was mixed with salt that was subsequently leached out after the formation and sintering of the body;

Figure 5 is a similar schematic sectional view of a body provided with a surface layer permeated with a homogeneously distributed asbestos filler;

Figures 6 and 7 are views of bodies provided with a surface layer of woven fabric, or metal mesh.

As shown schematically in Fig. 1, a quantity of virgin unsintered polytetrafluoroethylene powder 11 is covered and superposed by a layer 12 of the same material which has been previously compressed, sintered and ground, to provide a quantity of material in which the particles have a modified structure, as previously described. Since the material of the body and the material of the superposed layer 12 are both the same material, and differ only in physical form, both quantities of material are completely compatible. By conventional practice and procedure the two quantities of the material are then compressed within a four or five to one ratio to form a compressed body of polytetrafluoroethylene as shown schematically in Fig. 2.

In a compressed form shown in Fig. 2, the main body 11 of the polytetrafluoroethylene has been tightly compacted to exclude all of the air from the body of the material, which is substantially solid, within the reasonable meaning of that term. The top layer 12 of modified fibrous material is also, of course, compressed, but it lacks the interlocked compactness as established in the body 11. The top layer 12 is thus in the nature of a mat or matrix with a main structural formation having small distributed air cavities, or interconnecting passages, formed therein. However, when the entire compacted body as shown in Fig. 2 is subjected to the conventional sintering temperature, about 700 degrees Fahrenheit, or above, the entire body is then formed into a tough integrated unitary body, in which there appears to be no line of demarcation or bonding between the body 11 and the layer 12. Because of the fact that they are both of the same basic material, they are completely compatible and the body and the superposed layer are joined together as one integral unit with the same normal inherent bonding action that occurs between the particles in the body 11 itself. The only effective difference occurs in the cellular or matrix structure of the region encompassed by the layer 12 itself.

This matrix or mat structure of the top layer 12 is indicated in Fig. 3, and shows the cavities or cells 13 into which an applied fluid cement can flow to form the roots that are necessary for a strong cohering bond to this polytetrafluoroethylene material.

While the invention has been illustrated as applied to the formation of a relatively flat piece of material, it is to be understood as being within the scope and contemplation of this invention that such modified polytetrafluoroethylene material may be applied to any desired article as formed in stationary molds or to material extruded or otherwise formed, where the finished article is to be entirely free of any foreign material and is to consist of only polytetrafluoroethylene and yet be cementable to permit the application of an external article to the polytetrafluoroethylene, or to permit the mounting or secural of the polytetrafluoroethylene either in sheet form or in other shaped form to any desired surface.

Similarly, it is also within the contemplation of this invention that the sheet of material or other shaped body of polytetrafluoroethylene may be treated in accordance with the present invention to provide an integrated structural unit which may be readily combined with other elements, as for example, in the molding of a supporting structure for the Teflon, where the Teflon is to be imbedded in the molded part and become an integral portion thereof. In that case the plastic material into which the Teflon material is to be bonded to provide a Teflon surface at some predetermined location, can all be readily accomplished by first forming the polytetrafluoroethylene portion to have a receptive surface area as disclosed in this invention, to receive the fluid plastic material to which the polytetrafluoroethylene is to be bonded.

As a variation of such modified layer 12, to be susceptible to cementing, the effect of controlled porosity may be established by procedures that involve other materials, however.

Thus, soluble salts may be mixed with and in a shallow superposed layer, and then leached out, before or after the sintering operation, to leave a surface layer 15 that will be rough and porous. Similarly, and alternatively, salts or other solid or liquid matter that will gas off within the range of the elevated sintering temperature may be mixed in the superposed layer. The gassing-off action will leave the voids or cavities to receive a bonding cement. In this modification, the salts, either for leaching out or gassing-off may be mixed with virgin pre-sintered material itself, where the nature of the salt is otherwise not undesirable for that specific application, or is such that it will not leave any undesirable or harmful residues.

As an example, sodium chloride may be used as a salt to be leached out. The salt may be mixed in various proportions with the virgin pre-sintered powder material before the entire quantity is compressed. As a variant method, instead of mixing the salt with the top layer for porosity of that layer, the basic body quantity 11 may be covered by a sprinkled salt layer which will merely roughen the top surface when the quantity is compressed and sintered and the salt leached out. The roughened surface may be adequate for receiving and holding a bonding cement for many applications.

Ordinarily, sodium chloride will be the most satisfactory salt to use, because of its relative cheapness and its easy solubility in water for leaching out. This process contemplates the general use of any salt, however, that may be dissolved out directly by solvents or by electrolytes. Thus, salts that are insoluble in water but readily dissolved by various other solutions or electrolytes are within the scope of this invention, since the polytetrafluoroethylene will be unaffected by such solutions or electrolytes employed to dissolve out the salts from the surface layer.

Because of the resistance of the polytetrafluoroethylene to acids and alkalies, even metallic particles soluble in acids may be used, or particles of compounds may be used that will react with acids or alkalies to be dissolved directly or to be conditioned for removal by other solvents or solutions.

Another method for producing controlled porosity involves the use of absorbent materials in the superposed layer of virgin material. These absorbent materials may be such as to be permeable to suitable cementing materials. For example, asbestos 18 may be thoroughly and homogeneously mixed in the superposed layer of virgin material. The asbestos itself is permeable and provides small air spaces or cells to receive a liquid cement for anchorage for a strong cohesive bond, as in Figure 5.

Still another method for producing a controlled porosity at a selected surface area involves the application of mechanical structures to the basic body quantity of material, such as body 11. Thus, a pre-formed lattice structure may be secured to the surface of the body quantity during the forming operation. For example, as in Figure 6, a layer of woven glass cloth 21 may be pressed into the top region of a quantity 22 of virgin powder Teflon. Portions of the glass cloth may be arranged to be free and be slightly spaced from the body 22, to take applied cement, and other portions pressed into the powder to be firmly anchored in the final body. Woven metallic screen 23 (Fig. 7) may be similarly employed.

A variation of this method includes the use of Teflon cloth, woven from the Teflon filament. The filament may be roughened slightly before being woven, to restore some of the original fibrous condition to the woven filaments, in the manner used to restore the fibrous condition to the post-sintered particles in the primary invention described herein. In this case, the compatibilty of the Teflon body and the Teflon cloth assures a strong cohesive bond. As a variant of Teflon cloth, a thin sheet of Teflon tape with a large number of perforations may be used.

Where Teflon products are formed by extrusion processes, the first method disclosed, using modified post-sintered polytetrafluoroethylene, is most suitable and convenient. For example, tape made by the extrusion process may be treated by addition of modified post-sintered material to either surface or both surfaces to provide effective cementing areas on the tape.

Thus, by the present invention and its variants, a Teflon body, normally and conventionally not receptive to cementing action, may be modified to have a selected surface area roughened or of controlled porosity so the surface will accept a predetermined cementing agent and permit a strong cohesive bond to be formed.

The invention is not limited to any specific examples indicated, but is general in scope and contemplation within the ranges of materials having the characteristics indicated, for the purposes and uses specified. After the formation of the various compressed bodies, they will be subjected to the present conventional sintering temperatures of about 600 to 700 degrees Fahrenheit, and in the centigrade scale, 315 degrees centigrade to 371 degrees centigrade and in general above about 327 degrees centigrade.

What is claimed is:

1. The method of forming an article of polytetrafluoroethylene with a cementable surface for receiving a bonding cement to permit the article to be bonded to another article, which method comprises suitably disposing a quantity of normal powdered polytetrafluoroethylene according to the volume of the article to be made; disposing a layer of modified post-sintered polytetrafluoroethylene over the normal powdered polytetrafluoroethylene at the region where the cementable surface is to be located; compressing the normal polytetrafluoroethylene and the modified polytetrafluoroethylene into a body of reduced volume between 20 and 25 percent of its initial uncompressed volume; and then sintering the compresesd body at a temperature of at least 327 degrees centigrade.

2. The method of forming an article with a porous layer at a predetermined area of the article to enable a cohesive cementing bond to be effected with said porous layer, which comprises the steps of first compressing a quantity of normal powdered polytetrafluoroethylene into a body of reduced volume of about 25 percent of its uncompressed volume; then sintering the body to a temperature of at least 327 degrees centigrade to convert the material to a tough cohesive body; then pulverizing the tough body to derive fibrous comminuted particles, characterized by resiliency and toughness; then using such particles with their newly-imparted characteristics as a layering material on quantities of normal powdered polytetrafluoroethylene; and then subjecting the quantity of the normal and the layered material to compression and to sintering to form a finished article.

3. An article of polytetrafluoroethylene, characterized by a basic body of normal dense, non-porous polytetrafluorcethylene, and a surface layer of modified polytetrafluorcethylene which consists of compressed matted fibrous particles constituting a porous surface layer capable of readily accepting a fluid bonding cement.

4. An article of polytetrafluoroethylene having a basic body of normal non-porous polytetrafluoroethylene, and a porous integral surface layer of post-sintered polytetrafluoroethylene.

5. An article of polytetrafluoroethylene having a body of compactly compressed polytetrafluoroethylene, and an integral layer of porous compressed polytetrafluoroethylene, having a mat structure.

6. An article of polytetrafluoroethylene, comprising a body portion of normal compressed and sintered polytetrafluoroethylene, and a surface layer of porous absorbable structure integrally bonded to the body.

7. The method of forming an article of polytetrafluoroethylene with a porous surface to be receptive to a cementing agent, which consists in disposing a quantity of polytetrafluoroethylene powder to form the body of the article, disposing a layer of porous absorbable material on said quantity, compressing the quantity of powder and the layer material into a compact body, and sintering the body at a temperature of about 700 degrees Fahrenheit.

8. A cementable tape of polytetrafluoroethylene, comprising a tape body of non-porous polytetrafluoroethylene having an absorbable surface integrally formed on the tape body.

9. A cementable article of polytetrafluoroethylene comprising a dense, non-porous body of polytetrafluoroethylene and an integral sheet of separately preformed porous absorbable material.

10. A cementable article, as in claim 9, in which the sheet material is a pre-woven fabric of polytetrafluoroethylene.

11. A cementable article, as in claim 9, in which the sheet material is a perforated sheet of polytetrafluoroethylene.

12. A cementable article, as in claim 9, in which the sheet material is a metal mesh.

13. A cementable article as in claim 9 in which the sheet material is comprised of woven glass.

14. A cementable article comprising a dense non-porous body of polytetrafluoroethylene and a surface element of porous absorbable structure integrally bonded to the sheet body portion, said surface element including a mixture of asbestos fiber and powdered pre-sintered polytetrafluoroethylene, the amount of said asbestos fiber being a maximum on one surface of said element and decreasing to a minimum at an opposite surface of said element.

15. An artcile of polytetrafluoroethylene characterized by a body portion of dense, non-porous polytetrafluoroethylene which is incapable of forming an adhesive bond with cement with a surface layer consisting of compressed matted fibrous particles of polytetrafluoroethylene in spaced array for absorption of cement in the interstitial areas thereof to form a cementable surface bonded to the body portions.

16. The method of forming a cementable article of polytetrafluoroethylene having a body portion of dense non-porous polytetrafluoroethylene incapable of forming an adhesive bond with cement and a surface layer for said body portion consisting of compressed matted partially fibrous particles of polytetrafluoroethylene in spaced array for absorption in the interstitial areas thereof of cement which includes the steps of micro-pulverizing a sintered solid mass of polytetrafluoroethylene to produce discrete particles of polytetrafluoroethylene characterized by being at least in part fibrous, adding a layer of the sintered particles to a layer of unsintered powdered fibrous polytetrafluoroethylene, compressing the powdered layers of sintered and unsintered particles, and then sintering said compressed layers to form an integral body having a dense non-porous layer and a contiguous cementable porous layer characterized by a plurality of passages formed by an array of spaced micro-pulverized particles of polytetrafluoroethylene.

References Cited in the file of this patent

UNITED STATES PATENTS

| | | |
|---|---|---|
| 2,357,513 | Harmon | Sept. 5, 1944 |
| 2,400,091 | Alfthan | May 14, 1946 |